(12) United States Patent
Budhathoki et al.

(10) Patent No.: US 10,848,965 B1
(45) Date of Patent: Nov. 24, 2020

(54) COMPROMISED-MESSAGE EXPLOIT PROTECTION

(71) Applicant: QUALCOMM Incorporated, San Diego, CA (US)

(72) Inventors: Krishna Ram Budhathoki, San Diego, CA (US); Ankur Bhattacharjee, San Diego, CA (US); Mattias Kaulard Huber, Solana Beach, CA (US); Subrato Kumar De, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/798,555

(22) Filed: Feb. 24, 2020

Related U.S. Application Data

(60) Provisional application No. 62/873,506, filed on Jul. 12, 2019.

(51) Int. Cl.
*H04W 12/00* (2009.01)
*H04W 48/18* (2009.01)
(Continued)

(52) U.S. Cl.
CPC ....... *H04W 12/00409* (2019.01); *H04W 8/16* (2013.01); *H04W 48/18* (2013.01); *H04W 84/042* (2013.01)

(58) Field of Classification Search
CPC ............. H04L 63/0428; H04L 2209/80; H04L 63/1408; H04L 63/02; H04L 63/123;
(Continued)

(56) References Cited

U.S. PATENT DOCUMENTS

2007/0165754 A1   7/2007  Kiukkonen et al.
2011/0307699 A1*  12/2011 Fielder ................ G06F 21/6218
                                                    713/172
(Continued)

OTHER PUBLICATIONS

IEEE P802.11 Wireless LANs High Resolution FTM, Jul. 13, 2015, Amichai Sanderovich & Carlos Aldana (Year: 2015).

*Primary Examiner* — Nathan S Taylor
(74) *Attorney, Agent, or Firm* — Hunter Clark PLLC

(57) ABSTRACT

A method of detecting compromised message information includes: wirelessly receiving, at a mobile wireless communication device, present unprotected information and present protected information; retrieving previous unprotected information, corresponding to the present unprotected information, and previous protected information, corresponding to the present protected information, from a memory of the mobile wireless communication device; comparing the present unprotected information to the previous unprotected information to determine that an unprotected information change has occurred; comparing the present protected information to the previous protected information to determine whether a protected information change has occurred; and determining that the present unprotected information is valid in response to the protected information change having occurred and being consistent with the unprotected information change, or that the present unprotected information is invalid otherwise.

30 Claims, 6 Drawing Sheets

(51) Int. Cl.
*H04W 84/04* (2009.01)
*H04W 8/16* (2009.01)

(58) Field of Classification Search
CPC ....... H04L 63/08; H04L 63/145; H04L 63/10;
H04L 63/14; H04L 63/20; H04L 9/0643;
H04L 9/0866; H04L 9/0869; H04L
9/0891; H04L 9/3226; H04L 9/3236;
H04L 63/0869; H04L 63/126; H04L
63/1425; H04L 9/0838; H04L 9/3247;
H04L 63/0209; H04L 63/1416; H04L
67/22; H04L 67/306; H04L 12/40006;
H04L 12/4135; H04L 2012/40215; H04L
2012/40273; H04L 2209/72; H04L
63/1458; H04L 12/40058; H04L
12/40071; H04L 12/40104; H04L 29/06;
H04L 63/04; H04L 63/0435; H04L
63/1491; H04L 9/08; H04L 9/32; H04L
9/06; H04L 29/08; H04L 9/00; H04L
12/40; H04W 12/0017; H04W 12/0027;
H04W 12/04031; H04W 12/04033;
H04W 12/1006; H04W 12/0013; H04W
12/0602; H04W 12/1202; H04W 36/0038;
H04W 48/02; H04W 60/00; H04W 76/10;
H04W 8/24; H04W 12/12; H04W
12/0609; H04W 12/08; H04W 12/1008;
H04W 12/1204; H04W 48/10; H04W
56/001; H04W 12/04; H04W 12/06;
H04W 12/10; H04W 12/00; H04W 12/02;
H04W 36/00; H04W 56/00; H04M 3/533;
H04M 3/50
USPC ........................................................ 370/357
See application file for complete search history.

(56) References Cited

U.S. PATENT DOCUMENTS

| | | | |
|---|---|---|---|
| 2013/0178208 A1* | 7/2013 | Dahlen | H04W 48/18 455/435.2 |
| 2013/0265954 A1* | 10/2013 | Dahlen | H04W 48/14 370/329 |
| 2014/0038598 A1 | 2/2014 | Ren et al. | |
| 2016/0192411 A1* | 6/2016 | Mori | H04W 8/06 370/329 |
| 2016/0309332 A1* | 10/2016 | Norrman | H04W 24/08 |
| 2017/0331577 A1* | 11/2017 | Parkvall | H04L 5/1469 |
| 2019/0132740 A1* | 5/2019 | De | H04W 12/1202 |
| 2020/0045725 A1* | 2/2020 | Mochizuki | H04W 72/046 |
| 2020/0236554 A1* | 7/2020 | Lee | H04W 12/1202 |

* cited by examiner

COMPROMISED-MESSAGE EXPLOIT PROTECTION

CROSS-REFERENCE TO RELATED APPLICATION

This application claims the benefit of U.S. Provisional Application No. 62/873,506, filed Jul. 12, 2019, entitled "COMPROMISED-MESSAGE EXPLOIT PROTECTION," and assigned to the assignee hereof, the entire contents of which are hereby incorporated herein by reference.

BACKGROUND

Low-cost, yet sophisticated, equipment (e.g., USRP/SDR (universal software radio peripheral/software defined radio), open-source software) has become available, readily enabling attackers to inject a message over a valid signal between a base station (BS) and a user equipment (UE) without employing a fake base station (FBS). The injected message may come from a valid BS and may alone, or in combination with one or more other messages, trigger one or more exploits (one or more actions exploiting one or more vulnerabilities in code or operation of a system). An attacker may leverage the capture effect, where only the stronger of two signals (with a minimum of 3 dB difference) at or near the same frequency will be demodulated. The attacker may create an attack subframe that includes attack information and send the subframe with higher power (e.g., 3 dB higher) than a valid subframe to effectively overwrite the valid subframe. A UE that receives the attack subframe would decode the attack subframe while discarding the valid subframe due to signal overshadowing, where the UE only decodes a signal having the highest received power from multiple, multiplexed received signals. Repetition of the exploit may continue to trick the UE to trigger unwanted activities that could lead to undesired consequences such as service disruption or wasteful computations (leading, e.g., to battery drain).

SUMMARY

An example mobile wireless communication device includes: a memory; an antenna configured to send and receive signals; and a processor, communicatively coupled to the antenna and to the memory, configured to: receive present unprotected information and present protected information; retrieve previous unprotected information, corresponding to the present unprotected information, and previous protected information, corresponding to the present protected information, from the memory; compare the present unprotected information to the previous unprotected information to determine that an unprotected information change has occurred; compare the present protected information to the previous protected information to determine whether a protected information change has occurred; and determine that the present unprotected information is valid in response to the protected information change having occurred and being consistent with the unprotected information change, or that the present unprotected information is invalid otherwise.

Implementations of such a mobile wireless communication device may include one or more of the following features. The processor is configured to determine that the present unprotected information is invalid based on a determination that the present protected information is the same as the previous protected information. The present unprotected information comprises a first Tracking Area Code (TAC), and wherein the processor is configured to determine that the present unprotected information is valid in response to: the previous protected information comprising a portion of a Tracking Area Identity that includes a second TAC; the present protected information comprising a third TAC; the second TAC differing from the third TAC; and the third TAC matching the first TAC. The processor is configured to determine that the present unprotected information is invalid in response to the present protected information differing from the previous protected information but not including the present unprotected information. The processor is configured to replace the previous protected information in the memory with the present protected information in response to the present protected information differing from the previous protected information and including the present unprotected information.

Also or alternatively, implementations of such a mobile wireless communication device may include one or more of the following features. To determine whether the protected information change is consistent with the unprotected information change, the processor is configured to determine whether a protected protocol has changed consistent with the unprotected information change. The processor is configured to determine that the present unprotected information is invalid in response to determining: that a first time window passes without an expected protected indication being received, or that an unexpected protected indication is received within a second time window. The unexpected protected indication comprises an ATTACH ACCEPT message, or a TAU (Tracking Area Update) ACCEPT message, from a base station from which the mobile wireless communication device detached, or comprises an ATTACH REJECT message, or a TAU REJECT message, in response to an attempt to attach to a base station corresponding to a PLMN (Public Land Mobile Network) indicated in an unprotected message.

Also or alternatively, implementations of such a mobile wireless communication device may include one or more of the following features. The processor is configured to send a request for the present protected information in response to the processor determining that the unprotected information change occurred.

Another example mobile wireless communication device includes: receiving means for wirelessly receiving present unprotected information and present protected information; means for retrieving previous unprotected information, corresponding to the present unprotected information, and previous protected information, corresponding to the present protected information, from a memory of the mobile wireless communication device; means for comparing the present unprotected information to the previous unprotected information to determine that an unprotected information change has occurred; means for comparing the present protected information to the previous protected information to determine whether a protected information change has occurred; and determining means for determining that the present unprotected information is valid in response to the protected information change having occurred and being consistent with the unprotected information change, or that the present unprotected information is invalid otherwise.

Implementations of such a mobile wireless communication device may include one or more of the following features. The determining means are for determining that the present unprotected information is invalid in response to determining that the present protected information is the same as the previous protected information. The present unprotected information includes a first Tracking Area Code (TAC), and wherein the determining means are for determining that the present unprotected information is valid in response to: the previous protected information comprising a portion of a Tracking Area Identity that includes a second TAC; the present protected information comprising a third TAC; the second TAC differing from the third TAC; and the third TAC matching the first TAC. The determining means are for determining that the present unprotected information is invalid in response to determining that the present protected information differs from the previous protected information but does not include the present unprotected information. The mobile wireless communication device includes means for replacing the previous protected information in the memory of the mobile wireless communication device with the present protected information in response to the present protected information differing from the previous protected information and including the present unprotected information. The determining means are for determining that the present unprotected information is invalid in response to determining: that a first time window passes without an expected protected indication being received, or that an unexpected protected indication is received within a second time window.

An example method of detecting compromised message information includes: wirelessly receiving, at a mobile wireless communication device, present unprotected information and present protected information; retrieving previous unprotected information, corresponding to the present unprotected information, and previous protected information, corresponding to the present protected information, from a memory of the mobile wireless communication device; comparing the present unprotected information to the previous unprotected information to determine that an unprotected information change has occurred; comparing the present protected information to the previous protected information to determine whether a protected information change has occurred; and determining that the present unprotected information is valid in response to the protected information change having occurred and being consistent with the unprotected information change, or that the present unprotected information is invalid otherwise.

Implementations of such a method may include one or more of the following features. Determining that the present unprotected information is invalid comprises determining that the present protected information is the same as the previous protected information. The present unprotected information includes a first Tracking Area Code (TAC), and the present unprotected information is determined to be valid in response to: the previous protected information comprising a portion of a Tracking Area Identity that includes a second TAC; the present protected information comprising a third TAC; the second TAC differing from the third TAC; and the third TAC matching the first TAC. Determining that the present unprotected information is invalid includes determining that the present protected information differs from the previous protected information but does not include the present unprotected information. The method includes replacing the previous protected information in the memory of the mobile wireless communication device with the present protected information in response to the present protected information differing from the previous protected information and including the present unprotected information.

Also or alternatively, implementations of such a method may include one or more of the following features. The method includes determining whether the protected information change is consistent with the unprotected information change by determining whether a protected protocol has changed consistent with the unprotected information change. Determining that the present unprotected information is invalid includes determining: that a first time window passes without an expected protected indication being received, or that an unexpected protected indication is received within a second time window. The unexpected protected indication comprises an ATTACH ACCEPT message, or a TAU (Tracking Area Update) ACCEPT message, from a base station from which the mobile wireless communication device detached, or comprises an ATTACH REJECT message, or a TAU REJECT message, in response to an attempt to attach to a base station corresponding to a PLMN (Public Land Mobile Network) indicated in an unprotected message.

Also or alternatively, implementations of such a method may include one or more of the following features. The method includes sending a request from the mobile wireless communication device for the present protected information in response to determining that the unprotected information change has occurred.

An example non-transitory, processor-readable storage medium includes processor-readable instructions configured to cause a processor to: receive present unprotected information and present protected information; retrieve previous unprotected information, corresponding to the present unprotected information, and previous protected information, corresponding to the present protected information, from a memory; compare the present unprotected information to the previous unprotected information to determine that an unprotected information change has occurred; compare the present protected information to the previous protected information to determine whether a protected information change has occurred; and determine that the present unprotected information is valid in response to the protected information change having occurred and being consistent with the unprotected information change, or that the present unprotected information is invalid otherwise.

Implementations of such a storage medium may include one or more of the following features. The instructions are configured to cause the processor to determine that the present unprotected information is invalid in response to the present protected information being the same as the previous protected information. The present unprotected information includes a first Tracking Area Code (TAC) and the instructions are configured to cause the processor to determine that the present unprotected information is valid in response to: the previous protected information comprising a portion of a Tracking Area Identity that includes a second TAC; the present protected information comprising a third TAC; the second TAC differing from the third TAC; and the third TAC matching the first TAC. The instructions are configured to cause the processor to determine that the present unprotected information is invalid in response to the present protected information differing from the previous protected information but not including the present unprotected information. The storage medium includes instructions configured to cause the processor to replace the previous protected information in the memory with the present protected information in response to the present protected information differing from the previous protected information and including the present unprotected information. The instructions are configured to cause the processor to determine that the present unprotected information is invalid in response to determining: that a first time window passes without an expected protected indication being received, or that an unexpected protected indication is received within a second time window.

DETAILED DESCRIPTION

Figure 1:
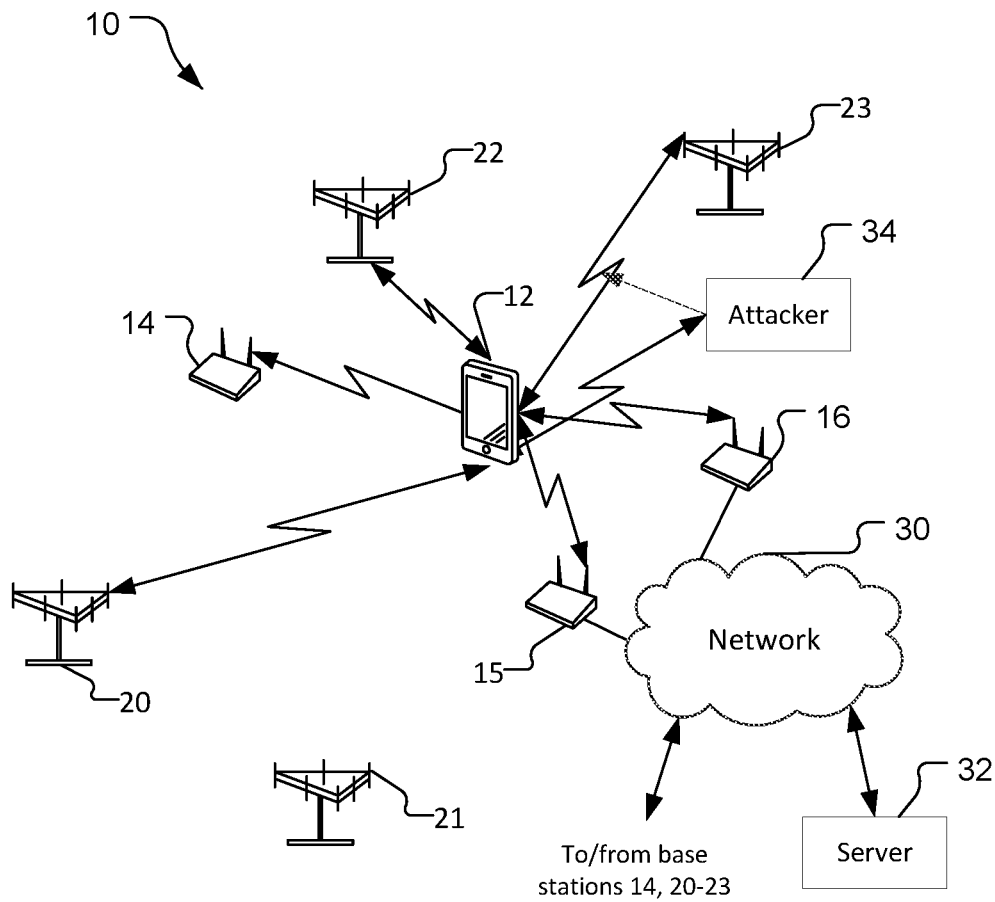
FIG. 1 is a simplified diagram of a wireless communication system.

Techniques are discussed herein for detecting and safeguarding against compromises by an attacker on unprotected content of broadcast messages. A valid base station may send messages, and an attacker may overwrite content of the unprotected messages. For example, an attacker may overwrite content by sending different content in an attack signal whose power is greater (e.g., 3 dB or more greater) than a legitimate signal from the base station. The different content corresponds to non-encrypted, non-integrity-protected content of the legitimate signal. The different content contained in the attack signal (alone or in combination, e.g., chained together, with one or more other signals) may trigger a UE that receives the attack signal to perform one or more unwanted activities. The unwanted activities may have one or more negative consequences, such as service disruption or wasteful computations (e.g., repeated communications sent by the UE to a base station, which may lead to battery drain).

In response to determining that unprotected information has changed (e.g., relative to previously-received unprotected information or previously-received protected information that includes content corresponding to the unprotected information (e.g., a tracking area code)), the UE may determine whether one or more corresponding (integrity) protected criteria are met indicating that protected information has changed accordingly. For example, the UE may obtain a change/update in the protected information. The change/update may be in the same message as the changed unprotected information, or in a subsequent message. As another example, the UE may detect the presence of an expected (integrity) protected indication (e.g., notification or message) from the base station on which the UE is camped within a time window due to the change in the unprotected information. As another example, the UE may determine the absence of an expected (integrity) protected indication from the base station within a time window, where the expected protected indication would be sent (or received) within the time window if the unprotected information remained unchanged. A protected indication (e.g., an integrity-protected indication) may be, for example, a message transmitted wirelessly the content of which can be verified not to have been unauthorizedly altered, e.g., due to being cryptographically signed, or an indication of an event that is triggered in a way that is not susceptible to compromise. An expected indication may be an indication that should be provided/received if a protocol continues to be performed without change, and an unexpected indication may be an indication that should not be provided/received if a protocol continues to be performed without change.

The UE may determine that the change in unprotected data is invalid in response to the UE determining that one or more protected criteria are not met. The change in unprotected data may be determined to be invalid if protected information corresponding to the unprotected information (e.g., information that is not integrity protected) is not changed in a manner consistent with the change in the unprotected information. The UE may request an update of the protected information, e.g., initiating a tracking area update, and use a lack of change in the protected information to conclude that the change in the unprotected information is invalid. The UE may receive updated protected information, or another indication of change to the protected information, e.g., through an update message or the protected indication, and compare updated protected information with protected information that was previously received and stored by the UE. If the updated protected information is the same as the previously-received and stored protected information, then the UE determines that the change in the unprotected information is invalid (e.g., erroneous and possibly malicious). Similarly, if no expected protected indication is received within a specified time window, or if an unexpected protected indication is received in a specified time window, then the UE may determine that the protected information has not changed, and thus that the change in the unprotected information is invalid. The UE can stop acting on/responding to any future repetition of the same change in the unprotected information after determining the change is invalid at least once, or possibly (only) after determining a threshold number of times that the change is invalid. The UE can determine the compromise of unprotected content through a protected aspect associated with the unprotected content being in an unexpected state (e.g., an expected event not occurring or an unexpected event occurring). The UE may, as an example, determine that the change in unprotected data is invalid only if two or more of the protected criteria are not met.

In response to determining that a change in unprotected information is invalid, the UE may take one or more countermeasures. The UE may take one or more countermeasures in response to a single determination that the unprotected information change is invalid (i.e., that the unprotected information is invalid), or may take one or more countermeasures only if the UE receives the invalid unprotected information multiple times (e.g., a threshold number of times). As an example countermeasure, the UE may implement a cell bar of (i.e., not allow communication with, or deprioritize communication with) the base station that has been compromised (i.e., whose signal has been overwritten). This is equivalent to quarantining the compromised base station. The UE may attempt to connect to the compromised base station after expiration of the cell bar (e.g., after a threshold amount of time), and the UE may then determine if the compromise still exists and repeat the cell bar if so.

If the updated protected information is not the same as the previously-received and stored protected information, then the UE can determine that the change in unprotected data is valid and can replace the stored protected information with the updated protected information. The UE may verify that the changed unprotected information corresponds to the updated protected information (e.g., that the changed unprotected information is in the updated protected information). That is, the UE may verify that not only is the updated protected information different from the stored protected information, but that the difference is representative of the change in the unprotected information.

Items and/or techniques described herein may provide one or more of the following capabilities, and/or other capabilities not mentioned. The taking of action due to signal overshadowing attacks may be inhibited and/or prevented, and may be inhibited and/or prevented without changing 3GPP specifications and/or without changing network entities (e.g., BS, NB, eNB, gNB). Techniques discussed herein may apply to numerous wireless communication technologies including LTE (Long Term Evolution), 3G, 2G, 5G NR NSA/SA (5G New Radio Non-Standalone/Standalone). Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

Referring to FIG. 1, a wireless communication system 10 includes a mobile device 12 (also referred to as a mobile wireless communication device), short-range base stations 14, 15, 16, cellular base stations 20, 21, 22, 23, a network 30, a server 32, and an attacker 34. The system 10 is a communication system in that components of the system 10 can communicate with one another directly or indirectly, e.g., via the network 30 and/or one or more of the base stations 14-16, 20-23. The mobile device 12 is shown as a smartphone, but other types of mobile devices may be used such as a laptop computer or a tablet computer. Still other mobile devices may be used, whether currently existing or developed in the future. The mobile device 12 is configured to communicate wirelessly with the base stations 14-16, 20-23. The base stations 14-16 are short-range base stations while the base stations 20-23 are cellular base stations in that the base stations 14-16 use lower transmit power than the base stations 20-23 for their respective wireless signal transmissions. Each of the base stations 14-16, 20-23 is communicatively coupled to the network 30 using, for example, a physical connection such as an electrical wire or an optical cable. The quantities of the base stations 14-16, 20-23 shown in FIG. 1 are examples used for illustration, and other quantities of short-range base stations and/or cellular base stations may be used. The server 32 may provide information to the mobile device 12 via the network 30 and one or more of the base stations 14-16, 20-23. For example, the server 32 may provide protected information (e.g., tracking area identifiers) as discussed herein. The attacker 34 may be a computer system operated by a user to inject signals into communications with the mobile device 12 as discussed herein.

The mobile device 12 is configured, and the base stations 14-16, 20-23 are configured, to have radio frequency (RF) signals sent by the base stations 14-16, 20-23 and received by the mobile device 12, and to have RF signals sent from the mobile device 12 and received by the base stations 20-23. The mobile device 12 may be called a mobile station (MS), a user equipment (UE), a terminal, a station, a device, a wireless device, a subscriber unit, a target, or other term. Each of the base stations 20-23 may be a wireless base transceiver station (BTS), a Node B, or an evolved NodeB (eNB), gNodeB (for 5G), etc., and each of the base stations 14-16 may be a femtocell, a Home Base Station, a small cell base station, a Home Node B (HNB), a Home eNodeB (HeNB), etc. The base stations 14-16, 20-23 may be referred to herein as nodes. The network 30 may be a 2G, a 3G, a 4G, or a 5G network, a hybrid network (e.g., a 3G/4G network), a network using a technology developed in the future, or a combination of two or more of these. The mobile device 12 is configured to communicate with the network 30 using one or more radio access technologies (RATs), such as GSM (Global System for Mobile Communications), code division multiple access (CDMA), wideband CDMA (WCDMA), Time Division CDMA (TD-CDMA), Time Division Synchronous CDMA (TDS-CDMA), CDMA2000, High Rate Packet Data (HRPD), Long Term Evolution (LTE), or 5G New Radio (NR). These are examples of network technologies that may be used to communicate with the mobile device 12 over a wireless link.

Figure 2:
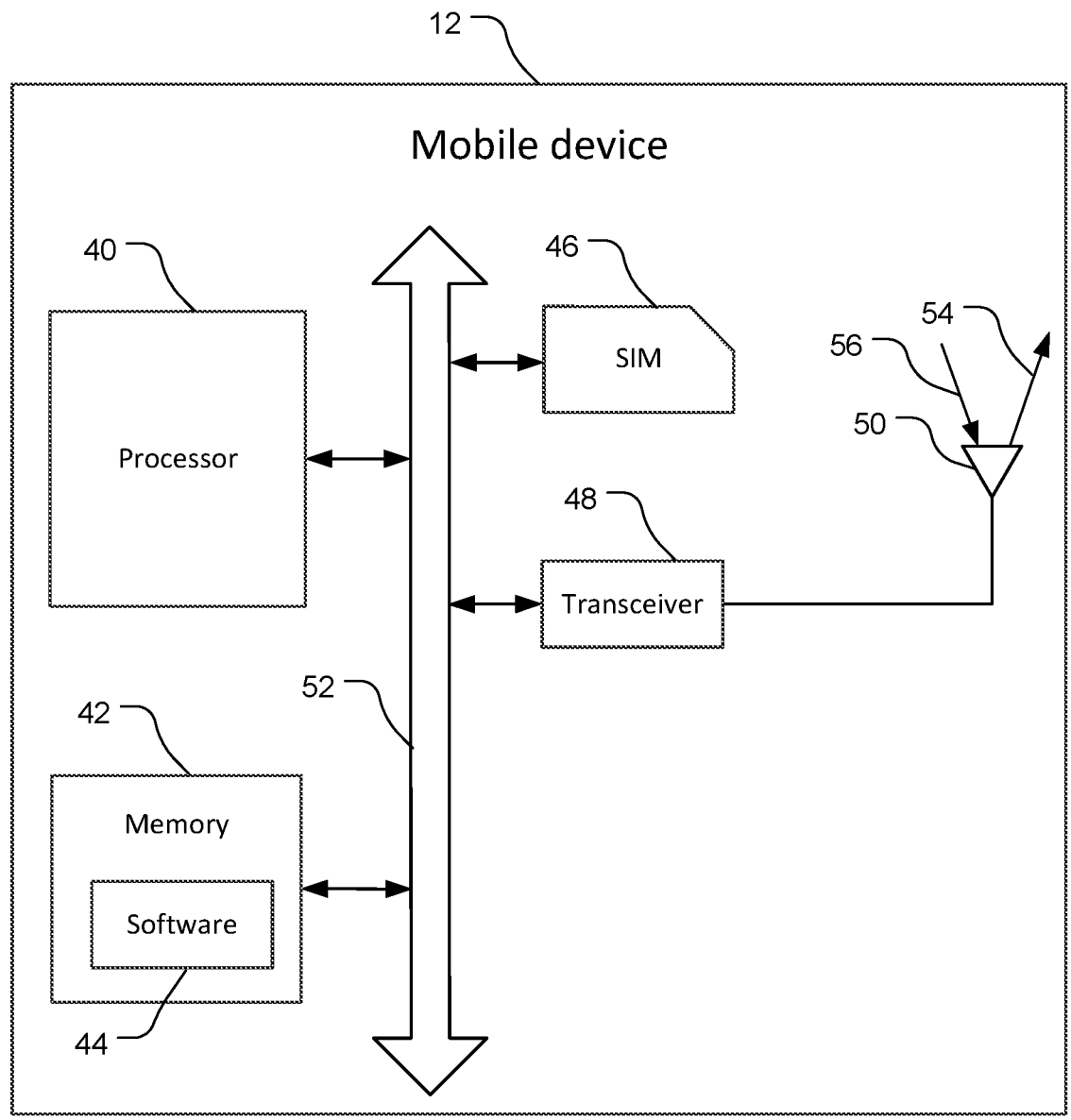
FIG. 2 is a block diagram of an example of a mobile device shown in FIG. 1.

Referring to FIG. 2, with further reference to FIG. 1, an example of the mobile device 12 includes a processor 40, a memory 42 including software 44, a subscriber identity module (SIM) 46, a transceiver 48, an antenna 50, and a bus 52. The processor 40 is preferably an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 40 may comprise multiple separate physical entities that can be distributed in the mobile device 12. The memory 42 may include random access memory (RAM) and/or read-only memory (ROM). The processor 40 is communicatively coupled to the memory 42. The memory 42 is a non-transitory, processor-readable storage medium that stores the software 44 which is processor-readable, processor-executable software code containing instructions that are configured to, when performed, cause or instruct the processor 40 to perform various functions discussed herein. The description may refer only to the processor 40 performing the functions, but this includes other implementations such as where the processor 40 executes software and/or firmware. The software 44 may not be directly executable by the processor 40 and instead may be configured to, for example when compiled and executed, cause or instruct the processor 40 (that may include one or more processors) to perform the functions discussed. Whether needing compiling or not, the software 44 contains the instructions to cause or instruct the processor 40 to perform the functions. The processor 40 in combination with the memory 42 provide means for performing functions as described herein, for example, receiving and analyzing signals from base stations, and producing and sending communications to a location server with information about the base stations. The software 44 may be loaded onto the memory 42 by being downloaded via a network connection, uploaded from a disk, etc. The processor 40, the memory 42, the SIM 46, and the transceiver 48 (and by extension the antenna 50) are communicatively coupled to one another via the bus 52, with the bus 52 being configured to convey information between the components.

The SIM 46 is configured to provide access to a communication network subscription, or simply "a subscription," associated with network 30. The SIM 46 may be, for example, part of a Universal Integrated Circuit Card (UICC) and may include a processor, ROM, RAM, Electrically Erasable Programmable Read-Only Memory (EEPROM) and/or circuitry. The SIM 46 may be configured to support LTE operation and LTE-U operation. The SIM 46 may be configured to store user account information, an international mobile subscriber identity (IMSI), SIM application toolkit (SAT) command instructions, and storage space for additional information, such as telephone book contact information. The SIM 46 may be omitted depending upon the desired interaction with the network 30.

The transceiver 48 and the antenna 50 are communicatively coupled to each other and configured to transmit and receive signals wirelessly. The antenna 50 is configured to receive transmission signals from the transceiver 48, and to transduce and send wireless signals 54 corresponding to the transmission signals received from the transceiver 48. Further, the antenna 50 is configured to receive wireless signals 56, sent by one or more base stations, to transduce the wireless signals 56 into received signals, and to send the received signals to the transceiver 48. While the antenna 50 is shown as one physical device, the antenna 50 may comprise multiple physical devices, e.g., with different devices for sending/receiving signals of different frequencies (e.g., in different frequency bands). For example, separate physical devices could be used for sending/receiving signals in a licensed frequency band and receiving signals in an unlicensed frequency band.

Figure 3:
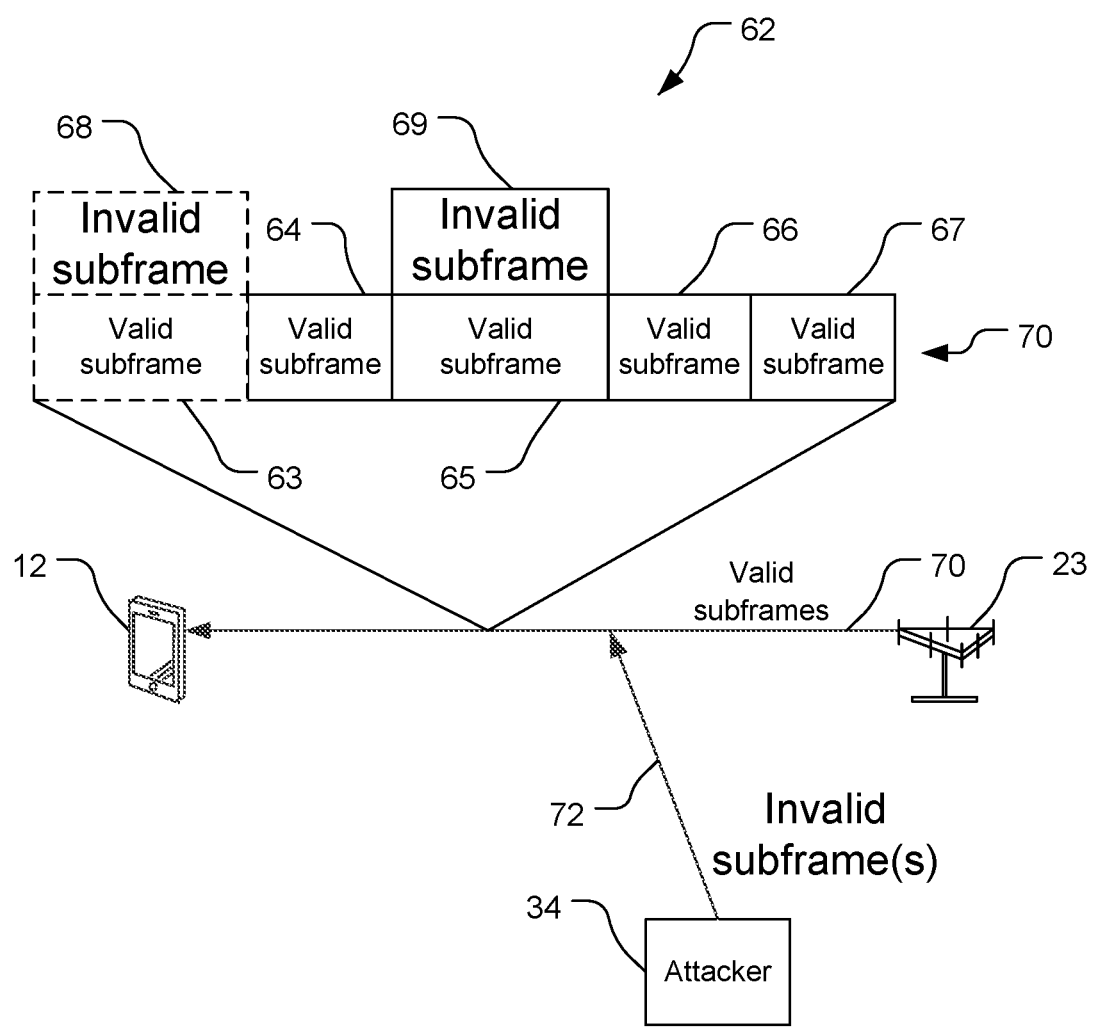
FIG. 3 is a simplified diagram of compromised communication between a mobile device and a base station shown in FIG. 1.

Referring also to FIG. 3, the base station 23 may send signals to the mobile device 12 and the attacker 34 may compromise an unprotected communication between the base station 23 and the mobile device 12. The attacker 34 may corrupt the transmitted signal from the base station 23 by capture effect. The signal sent from the base station 23 is valid, but in the transmission medium, that signal gets overwritten by an injected signal sent by the attacker 34, where the injected signal is of higher power, e.g., 3 dB or more greater in strength, than the signal from the base station 23. For ease of understanding, FIG. 3 shows the attacker 34 sending a signal into the signal sent by the base station 23, but the attacker 34 sends the injected signal to the mobile device 12 in a way that corrupts processing of the signal from the base station 23 by the mobile device 12.

As shown in the example of FIG. 3, a valid signal 70 sent from the base station 23 comprises valid subframes 63, 64, 65, 66, 67. The valid subframes 63-67 are unprotected information as they are susceptible to undetected compromise (e.g., having no associated mechanism for verifying whether the information has been altered), e.g., they are not integrity protected by a cryptographic signature key or other mechanism (e.g., a checksum). Conversely, protected information has one or more mechanisms in place to ensure that the information has not been altered in an unauthorized manner. Because the valid subframes 63-67 are not protected, the subframes 63-67 are susceptible to being superseded by other signals, detection of which may be difficult. The subframes 63-67 may contain various types of information for any number of types of communication. One or more of the subframes 63-67 may, for example, be a System Information Block (SIB) value tag field, such as the valid subframe 63. A value of a SIB value tag field may indicate whether a value of another portion of the valid signal 70 has changed compared to a previous version of the signal 70. Thus, the SIB value tag field may indicate that the remainder of the signal 70 has or has not changed value, or that one or more identified portions of the SIB have changed value or not. As another example of information in the signal 70, a value of a subframe, such as the valid subframe 65, may indicate a Tracking Area Code (TAC) as discussed more fully below.

As also shown in FIG. 3, in transit between the base station 23 and the mobile device 12, portions of the valid signal 70 get "overwritten" by an injected signal 72 sent by the attacker 34. The overwritten portions of the signal 70 are not eliminated, but because the injected signal is greater in strength than the signal from the base station 23, the overwritten portions are not read by the mobile device 12. Instead, the mobile device reads the higher-strength signal at any given time, and thus reads the injected signal 72 instead of the signal 70 where the signals 70, 72 overlap (i.e., when both the signal 70 and the signal 72 are received).

The injected signal 72 may, as shown, overlap in time with only portions of the valid signal 70, and thus affect only portions of the signal 70. The attacker 34 is synchronized with the base station 23 in that the injected signal 72 is synchronized with the valid signal 70. The injected signal 72 corresponds to portions of the signal 70 to dominate selective portions of the signal 70. The attacker 34 gets time and frequency synchronized with the valid subframe 63 transmitted by the base station 23 and injects the invalid (fake) subframe 68 and the invalid subframe 69 such that the invalid subframes 68, 69 are of higher power levels than the valid subframes 63, 65, e.g., at least 3 dB higher power than the powers of the valid subframes 63, 65. Due to the presence of the injected signal 72 and the valid signal 70, a composite signal 62 results that is compromised relative to the signal 70. Here, the composite signal 62 comprises the valid subframes 63-67 transmitted by the base station 23 and invalid subframes 68, 69 injected by the attacker 34. Due to the higher power of the injected signal 72 relative to the valid signal 70 in the composite signal 62, the invalid subframes 68, 69 of the injected signal 72 are read by the mobile device 12 instead of the valid subframes 63, 65 of the valid signal 70. That is, due to the capture effect, where the UE 12 will decode the highest-power-level signal received of the same or similar frequency, the UE 12 will decode the compromised subframes 68, 69 injected by the attacker 34 instead of the valid subframes 63, 65 that were transmitted by the base station 23.

Unprotected Information Change Detection

The mobile device 12 may be configured to detect a change in unprotected information received from the base station 23. The processor 40 may perform a handshake with the base station 23 to establish a communication connection between the mobile device 12 and the base station 23. The processor 40 may obtain baseline information as part of the handshaking process that authenticates the mobile device 12 and the base station 23 to each other, and may store the baseline information store, e.g., in the memory 42, as reference information. The processor 40 may be configured to compare future unprotected information received from the base station 23 against corresponding portions of the reference information to determine if a change in the unprotected information occurs. Changes in the unprotected information that are verified are used to update (e.g., overwrite) the reference information which may then be used by the processor 40 going forward to determine changes in the unprotected information received by the mobile device 12.

Also or alternatively, the mobile device 12 may be configured to determine that a change in unprotected information has occurred based on analysis of a value of a value tag field. For example, the processor 40 may be configured to analyze a value of a SIB value tag field, e.g., information received during the time of the valid subframe 63, in a received signal to determine whether the value of the SIB value tag field indicates that one or more values in a presently-received signal containing the SIB value tag field has changed relative to values of a similar signal that was previously sent, e.g., a signal that is configured similarly to the presently-received signal and from the same base station that sent the presently-received signal.

Valid/Invalid Change Determination

The mobile device 12 may be configured to determine whether a change in unprotected information is valid or invalid (e.g., erroneous, malicious, fake, etc.). The mobile device 12 may be configured to determine, in one or more of a variety of ways, whether a change in unprotected information is valid or invalid. For example, the processor 40 may be configured to determine whether updated protected information, corresponding to changed unprotected information, differs in a manner consistent with a change in unprotected information corresponding to the protected information. For example, the processor 40 may be configured to determine whether the updated protected information differs from or matches corresponding previously-received protected information. As another example, the processor 40 may be configured to determine whether there is a lack of a change in protocol corresponding to a change in unprotected information.

Content Mismatch

To help determine whether previously-received protected information differs from corresponding updated information, the processor 40 may be configured to obtain the updated protected information corresponding to the changed unprotected information. The updated protected information may correspond to the changed protected information by, for example, being derived from or conveyed with (e.g., in the same message with or otherwise linked to) the changed unprotected information. The processor 40 may obtain the updated protected information, e.g., by requesting such information, in response to determining that a change in unprotected information occurred, and in response to determining that the unprotected information corresponds to protected (e.g., integrity-protected) content. The processor 40 may obtain updated protected information from the same message that contained the changed unprotected information (e.g., in one or more fields subsequent to the changed unprotected information), or from one or more fields in another message that is linked to (e.g., points to or is pointed to by) the message containing the unprotected information. Also or alternatively, the processor 40 may obtain updated protected information by sending a request for this information to an appropriate recipient and receiving the updated protected information in a response to the request.

The processor 40 may be configured to compare the updated protected information with previously-received protected information corresponding to the updated protected information to determine whether a change in unprotected information is valid. The updated protected information may correspond to the previously-received protected information by, for example, conveying values for the same type(s) of information for the mobile device 12. For example, the protected information and updated protected information may both include Tracking Area Identity (TAI) lists for the mobile device 12, as discussed more fully below. The processor 40 may compare the updated protected information with previously-received protected information (e.g., obtained during handshake and stored (e.g., in the memory 42), or updated thereafter).

The processor 40 may determine whether the change to the unprotected information was valid or invalid based upon results of comparing the updated protected information with the previously-received protected information. The processor 40 may be configured to respond to the updated protected information matching the previously-received protected information by determining that the change to the unprotected information is invalid (e.g., erroneous, malicious, fake, etc.). The processor 40 may be configured to respond to the updated protected information not matching the previously-received protected information by determining that the change to the unprotected information may be valid. The processor 40 may be configured to respond to the determination that the change to the unprotected information may be valid by determining whether the protected information has changed similarly to the change to the unprotected information. For example, the processor 40 may determine that the change to the unprotected information is valid by confirming that the change to the unprotected information matches a change to (a corresponding portion of) the protected information. The processor 40 may determine that the change to the unprotected information is invalid in response to determining that a portion of the protected information corresponding to the change to the unprotected information was not changed, or that the portion of the protected information corresponding to the change to the unprotected information was different than the change to the unprotected information.

Lack of Protocol Change

To determine whether a change in unprotected information is valid or invalid, the processor 40 may be configured to determine whether there is a lack of a change in protocol corresponding to a change in unprotected information. For example, the processor 40 may be configured to determine whether an expected indication (e.g., an expected message, or an expected notification, e.g., a notification of occurrence of an expected event) is received. As another example, the processor 40 may be configured to determine whether an unexpected indication is received. An expected indication is an indication (e.g., a notification, a message) that will be received due to continued performance of a protocol that is presently being performed while an unexpected indication is an indication that will not be received due to continued performance of the protocol that is presently being performed. If the protocol presently being performed is indicated as being changed to a new protocol by invalid unprotected information, then an expected indication (in view of the new protocol) may not be received and/or an unexpected indication (in view of the new protocol) may be received. An indication may be external to the mobile device 12, e.g., a message sent to the mobile device 12, or a notification (e.g., of a protected event occurring) sent to the mobile device 12. An indication may be internal to the mobile device 12, e.g., an instruction by the processor 40 to perform a function of a protected event. A protected event is an event that occurs by a protocol being followed that cannot be controlled by an unprotected message, e.g., a protocol that is followed as a result of a protected message (e.g., a protected instruction) or followed without use of an unprotected message.

As an example, to determine whether there is a lack of a change in protocol corresponding to a change in unprotected information, the processor 40 may be configured to determine whether an expected protected indication is received. In response to the processor 40 detecting a change in unprotected information, the processor 40 may expect a subsequent indication (e.g., a notification of the occurrence of an integrity-protected event, a message, etc.) to be received within a time window after the change in the unprotected information. The processor 40 may be configured to respond to the expected indication not being received within the time window by determining that that change in the unprotected information is invalid. There may be different time windows for receiving different expected protected indications.

As another example, to determine whether there is a lack of a change in protocol corresponding to a change in unprotected information, the processor 40 may be configured to determine whether an unexpected protected indication is received. In response to the processor 40 detecting a change in unprotected information, the processor 40 may not expect a subsequent indication (e.g., a notification of the occurrence of an integrity-protected event, a message, etc.) that is received within a time window after the change in the unprotected information. For example, the processor 40 may not expect any indication within the time window or may expect a different indication than an indication that is received. In either case, the received indication is an unexpected indication. The processor 40 may be configured to respond to the unexpected indication being received within the time window by determining that that change in the unprotected information is invalid. There may be different time windows for receiving different unexpected protected indications. A time window for receiving an expected protected indication may be different from a time window for receiving an unexpected protected indication.

The following pseudocode illustrates an example of a valid/invalid unprotected information change detection process.

With a change in unprotected information X having been detected:
If X is associated with protected content Y, then
  If updated (observed) protected content Y==previously-recorded content Y, then
    Change in unprotected information X is invalid; Perform countermeasure(s) after one or more invalidity determinations
  Else
    Change in unprotected information X may be valid; Confirm whether change in unprotected information X matches a change in protected information Y.
  End
Else, if X is associated with a protected indication (notification, message) Y, then
  If change in X means that Y is expected, and Y is not received within time window, then change to X is invalid
  If change in X means that Y is unexpected, and Y is received within time window, then change to X is invalid
  Otherwise, change in X is valid.
End Various information may make up the information X and/or Y. For example, as discussed further below, the information X may be a Tracking Area Code (TAC) and the information Y may be a Tracking Area Identity (TAI) list. A TAC is a unique code that each wireless network operator assigns to each tracking area (TA) serviced by the network operator. A Tracking Area Identity (TAI) may include a public land mobile network identity (PLMN ID) and a TAC. The PLMN ID, which may be a combination of a mobile country code (MCC) and a mobile network code (MNC), is a unique code assigned to each operator in the world. This makes a TAI uniquely identified globally. A TAI list may include multiple TACs indicating TAs that the mobile device 12 may enter into without the mobile device 12 sending a Tracking Area Update (TAU) message to the server 32 to update the server 32 of the general location of the mobile device 12.

Operation

Figure 4:
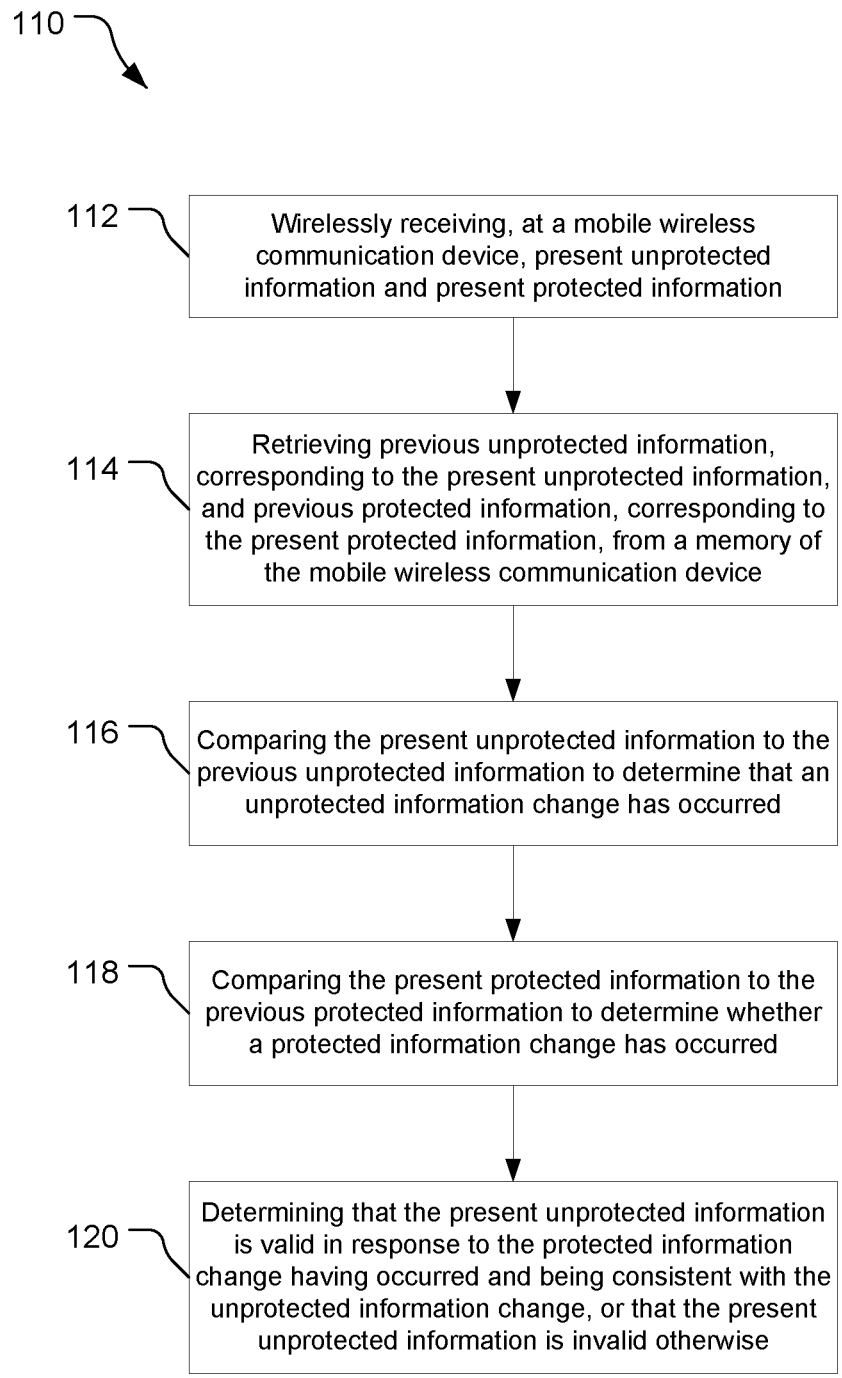
FIG. 4 is a block flow diagram of method of detecting compromised message information.

Referring to FIG. 4, with further reference to FIGS. 1-3, a method 110 of detecting compromised message information includes the stages shown. The method 110 may safeguard against an attack from a legitimate base station. The method 110 is an example only and not limiting. The method 110, or another method, may include determining that a change in unprotected information received by a mobile wireless communication device has occurred, and determining whether protected information corresponding to the unprotected information has changed in a manner consistent with the change in the unprotected information to determine whether the change in the unprotected information is valid, i.e., determining that the change in unprotected information is valid if the protected information changed consistent with the unprotected information change. The method 110 may be altered, e.g., by having stages added, removed, rearranged, combined, performed concurrently, and/or having single stages split into multiple stages.

At stage 112, the method 110 includes wirelessly receiving, at a mobile wireless communication device, present unprotected information and present protected information. For example, the processor 40, via the transceiver 48 and the antenna 50, may receive one or more messages that contain present unprotected information and present protected information. The present protected and unprotected information may correspond to each other, e.g., containing similar identification information and/or an indication of correspondence. The processor 40, the transceiver 48, and the antenna 50 may comprise receiving means for wirelessly receiving the unprotected information and the protected information, e.g., signals containing such information.

At stage 114, the method 110 includes retrieving previous unprotected information, corresponding to the present unprotected information, and previous protected information, corresponding to the present protected information, from a memory of the mobile wireless communication device. For example, the processor 40 may obtain stored unprotected and protected information corresponding to the present unprotected and protected information, respectively. For example, the processor 40 may use identifying information in the present unprotected and/or protected information to obtain stored unprotected and protected information containing the same or similar identifying information (e.g., a source identifier). The processor 40 and the memory 42 may comprise means for retrieving previous unprotected information and previous protected information.

At stage 116, the method 110 may include comparing the present unprotected information to the previous unprotected information to determine that an unprotected information change has occurred. For example, the processor 40 may compare unprotected information in an incoming signal with corresponding unprotected information previously received via another signal and stored in the memory 42 and determine that the stored unprotected information is different from the corresponding unprotected information in the incoming signal. The processor 40 and the memory 42 (e.g., the software 44) may comprise means for comparing the present unprotected information to the previous unprotected information.

At stage 118, the method 110 may include comparing the present protected information to the previous protected information to determine whether a protected information change has occurred. For example, the processor 40 may compare protected information in an incoming signal with corresponding protected information previously received via another signal and stored in the memory 42 and determine whether the stored protected information is different from the corresponding protected information in the incoming signal. The processor 40 and the memory 42 (e.g., the software 44) may comprise means for comparing the present protected information to the previous protected information.

At stage 120, the method 110 may include determining that the present unprotected information is valid in response to the protected information change having occurred and being consistent with the unprotected information change, or that the present unprotected information is invalid otherwise. For example, the processor 40 may determine whether protected content or a protected protocol has changed consistent with the change in the unprotected information. For example, the processor 40 determine that the present unprotected information is valid if the protected information change occurred and is identical to the unprotected information change. The processor 40 and the memory 42 (e.g., the software 44) may comprise means for determining that the present unprotected information is valid or invalid, e.g., whether protected information corresponding to the unprotected information has changed in a manner consistent with the change in the unprotected information to determine whether the change in the unprotected information is valid (changes are consistent) or invalid (either no change in protected information or change in protected information is inconsistent with change in unprotected information).

To determine whether the present unprotected information is valid, e.g., that protected content is changed consistent with the change to unprotected information, the processor 40 may determine whether present protected information, corresponding to the unprotected information, is the same as previous protected information corresponding to the unprotected information. The processor 40, possibly in conjunction with the memory 42 (including the software 44), may comprise means for determining whether the present protected information is the same as the previous protected information. The protected information corresponding to the changed unprotected information should have changed relative to the previously-received protected information if the change in the unprotected information was valid (e.g., not by an attacker or erroneous). The present protected information may be obtained from the same message that provides the changed unprotected information, or may be obtained separately, e.g., from another message. The processor 40 may send a request for the present protected information. For example, the processor 40 may respond to the unprotected information being changed by sending a request for protected information corresponding to the changed unprotected information. The processor 40 may determine whether protected information that contains content similar to the unprotected information has been changed similarly to the change in the unprotected information. For example, the processor 40 may determine whether a TAI list has been changed to have a new TAC if the unprotected information has been changed from an old TAC to the new TAC. The processor 40 may determine that the change in the unprotected information is invalid if the protected content has not been changed. The processor 40 may determine that the change in the unprotected information is invalid if present protected information differs from the previous protected information but does not include the present unprotected information (e.g., the TAI list has changed but the present TAI list does not include the new TAC). The processor 40 may determine that the change in unprotected information is valid if the present protected information differs from the previous protected information and includes the present unprotected information (e.g., the new TAC in the present protected information is different from the TAC in the previous protected information and the new TAC in the protected information matches (is identical to) the new TAC in the present unprotected information). The processor 40 may respond to the change in unprotected information being valid by replacing the previous protected information with the present protected information in the memory 42. The processor 40, possibly in conjunction with the memory 42 (including the software 44), may comprise means for replacing the previous protected information.

To determine whether a protected protocol has changed consistent with the change to unprotected information, the processor 40 may look for one or more of various indications (e.g., indications conveying content and/or indications of events occurring, etc.). The processor 40, possibly in conjunction with the memory 42 (including the software 44), may comprise means for determining whether a protected protocol has changed consistent with the change in the unprotected information. The processor 40 may, for example, determine whether an expected indication is received by the mobile device 12 and/or whether an unexpected indication is received by the mobile device 12. The processor 40 may determine whether a time window passes without an expected protected indication being received by the mobile device 12. The expected protected indication is protected from attack (e.g., from overshadow attack) and is expected in that the indication should be received during a certain time window if a protocol corresponding to (e.g., indicated by) the changed unprotected information is implemented. The indication may be protected, for example, by being signed by a cryptographic key. The processor 40 may conclude that the change in the unprotected information is invalid, and take appropriate action (e.g., countermeasure(s)), if the time window passes without the expected protected indication being received by the mobile device 12. The processor 40, possibly in conjunction with the memory 42 (including the software 44), may comprise means for identifying the change in the unprotected information as valid. As another example, the processor 40 may determine if an unexpected protected indication is received by the mobile device 12. The unexpected protected indication is unexpected in that the indication should not be received during a certain time window if a protocol corresponding to (e.g., indicated by) the changed unprotected information is implemented. Receipt of an unexpected protected indication suggests that the protocol corresponding to the changed unprotected information is not being implemented. For example, the change in unprotected information may mean that a previously-scheduled indication should not be received, or at least should not be received next. Thus, if the previously-scheduled indication is still received, then this is an unexpected indication in view of the change to the unprotected information. The processor 40 may conclude that the change in the unprotected information is invalid, and take appropriate action (e.g., countermeasure(s)), if the unexpected protected indication is received by the mobile device 12 in the time window. The time window during which the expected indication should be received may be the same or different from the time window during which the unexpected indication should not be received.

Expected and unexpected indications may take a variety of forms. For example, an expected protected indication may comprise an indication of a circuit-switched call in response to the mobile device 12 being paged, or a response to an unprotected paging message, or an offering of service from a cell indicated as being barred. An unexpected protected indication may comprise an ATTACH ACCEPT message, or a TAU (Tracking Area Update) ACCEPT message, from a base station from which the mobile device 12 detached, or may comprise an ATTACH REJECT message, or a TAU REJECT message, in response to an attempt to attach to a base station corresponding to a PLMN (Public Land Mobile Network) indicated in an unprotected message.

Example Implementation for TAI and TAC

In the following discussion, an example is given where a Tracking Area Code (TAC) is included in unprotected data and also corresponds to a portion of a Tracking Area Identity (TAI) list that is protected information. A TAI list includes multiple TACs with corresponding PLMN IDs (Public Land Mobile Network Identities).

Figure 5:
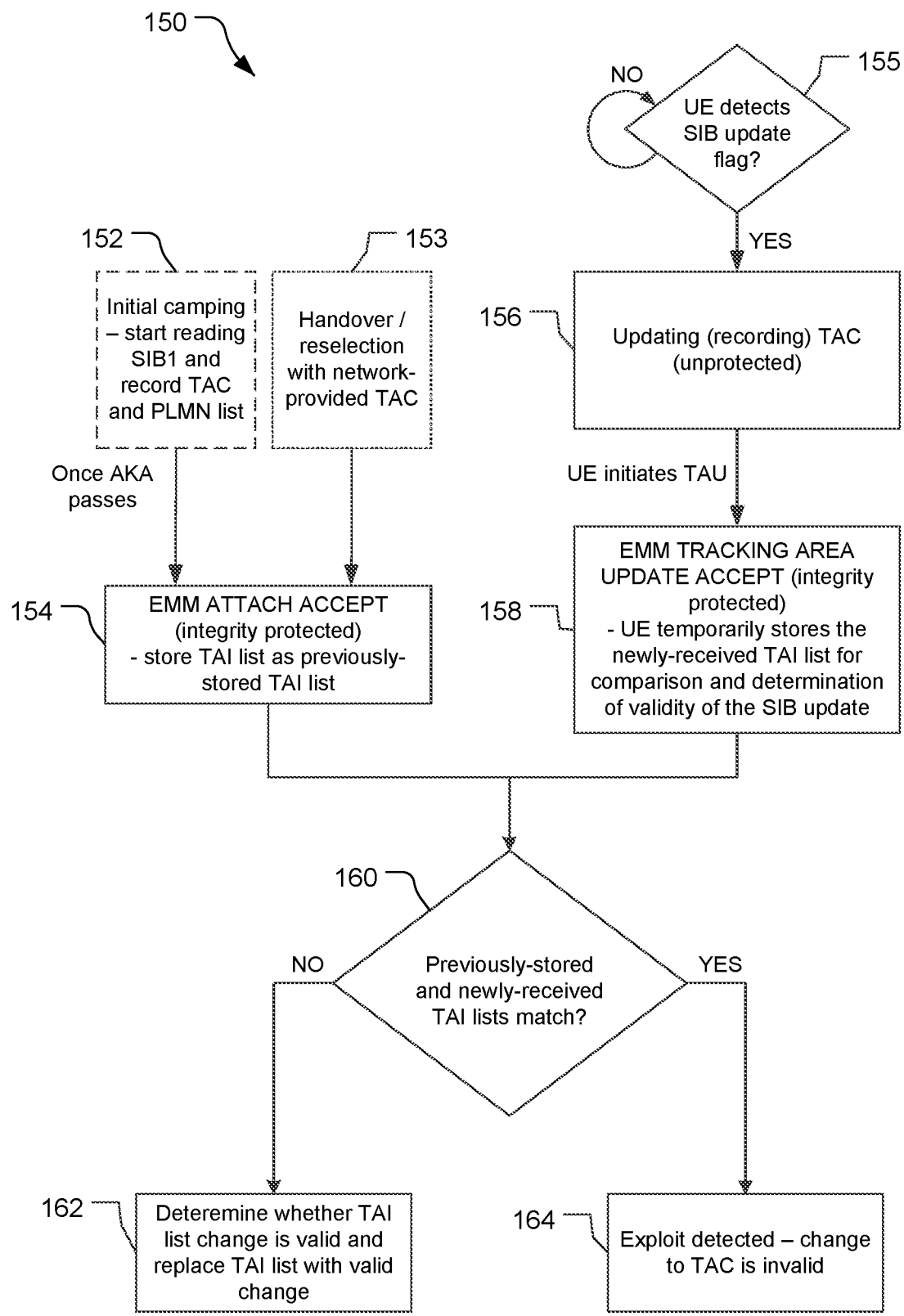
FIG. 5 is a block flow diagram of an example of the method shown in FIG. 4, where information being changed is a tracking area code.
Figure 6:
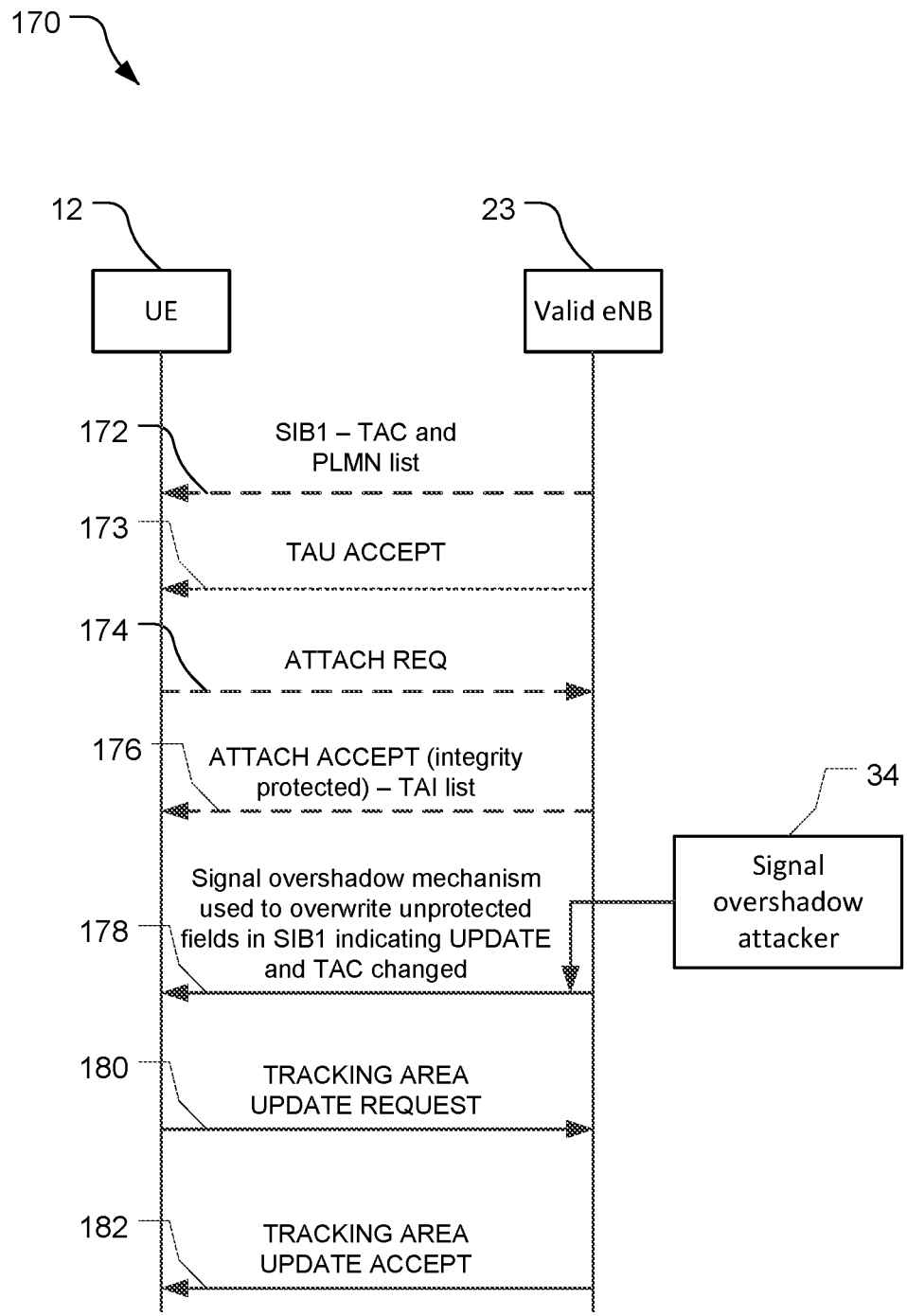
FIG. 6 is a flow diagram of communications between a mobile device and a base station, shown in FIG. 1, for the method shown in FIG. 5.

Referring to FIGS. 5 and 6, with further reference to FIGS. 1 and 2, a method 150 of detecting compromised message information includes the stages shown, with a corresponding communication flow 170. The method 150 safeguards against an attack on signals sent from a legitimate base station to a mobile device. In this example, an attack changes a TAC, the mobile device 12 is a UE, and the base station 23 is a valid eNB. The method 150 is an example only and not limiting. The method 150 may be altered, e.g., by having stages added, removed, rearranged, combined, performed concurrently, and/or having single stages split into multiple stages. In the method 150, only one of stages 152, 153 is performed at a time (hence different dashed lines used for the stages 152, 153), although both of the stages 152, 153 may be performed over time.

At stage 152, the method 150 includes initial camping by the UE 12 on the base station 23 during a cell selection process. The UE 12, and in particular the processor 40, handshakes with the base station 23 to authenticate the base station 23. As part of this handshaking, the base station 23 provides a SIB1 message 172 including a TAC and PLMN list and the processor 40 receives the SIB1 message via the transceiver 48 and the antenna 50, reads the SIB1 parameters, and stores (records), e.g., in the memory 42, the SIB1 parameters including the TAC and PLMN list. Once the authentication is completed (e.g., Authentication and Key Agreement (AKA) passes), the method 150 proceeds to stage 154.

Alternatively, at stage 153, the method 150 includes handover or reselection using a Tracking Area Update (TAU) with a network-provided TAC, where the network (here, the base station 23) sends a TAU Accept message 173 after handover/reselection is successful. In this case, the UE 12 obtains a TAI list from the TAU Accept message 173. The method 150 then proceeds to stage 154.

At stage 154, the method 150 includes storing the received TAI List. For example, an EPS (Evolved Packet System) Mobility Management (EMM) ATTACH ACCEPT (Integrity Protected) message 176 will have the integrity protected TAI List that comes after the ATTACH REQUEST message 174 is sent by the UE 12 to the valid eNodeB 23 as a result of the UE 12 processing the SIB1 message 172 during stage 152. Alternatively, the TAI List may have been obtained from the TAU Accept message 173 in stage 153 and stored in stage 154. Thus, FIG. 6 shows the messages 172, 174, 176 in dashed lines that are similar to each other and the box of the stage 152, and the message 173 in shown in a different dashed line that is similar to the box of the stage 153. The stored TAI List in block 154 is then considered to be a "previously-stored" TAI List. With the UE 12 camped to the base station 23, the processor 40 sends an ATTACH REQ (attach request) message 174 to the base station 23 via the transceiver 48 and the antenna 50. Mutual authentication of the UE 12 and the base station 23 follows. In response to successful mutual authentication, the base station 23 sends an ATTACH ACCEPT message 176 that is integrity protected, and that includes the TAI list. The processor 40 receives the TAI list via the antenna 50 and the transceiver 48 and stores the TAI list in the memory 42.

At stage 155, the method 150 includes analyzing SIB messages to determine whether a SIB update flag has been set to true. If no SIB update flag has been set to true, then the method 150 repeats stage 155. At some point after the TAI list has been stored at stage 154, the attacker 34 may inject a signal in the communication between the base station 23 and the UE 12 to overwrite the SIB update flag (SIB change indication) and the TAC/PLMN list (i.e., the TAC and/or the PLMN list). As shown in FIG. 3, the attacker 34 overwrites the valid subframes 63, 65 with the invalid subframes 68, 69 for the SIB update flag and the TAC/PLMN list, respectively. The processor 40 detects the change in the SIB update flag at stage 155, and the method 150 proceeds to stage 156.

At stage 156, the method 150 includes the UE 12 observing the injected TAC. In response to determining that the SIB change indication has been set to true, the UE 12 updates (records) the TAC that is different from the TAC previously received in the SIB, e.g., during initial connection setup and authentication or during the last valid update of the TAC. The new TAC may be a valid TAC, or an invalid TAC, e.g., injected by the attacker 34. The attacker 34 may inject a signal 178 as part of a SIB (in this case, SIB1) that overwrites one or more legitimate subframes from the base station 23, here changing the SIB update flag and the TAC. Whether valid or invalid, a SIB read flag, or a "systemInfoValueTag," is also set to true (or changed) either for valid reasons, or by the attacker 34 by injecting the signal 178 with higher power, e.g., at least 3 dB more power, than the signal from the legitimate base station 23. To inject the compromised subframe(s), the attacker 34 causes the base station 23 to send a subframe(s) with compromised information at a higher power level (e.g., 3 dB higher or more) than the legitimate subframe(s) that the attacker 34 seeks to replace such that the UE 12 will read the compromised information from the attacker 34 and not read the legitimate information due to the capture effect. By setting the systemInfoValueTag field of the SIB to true (or changed), the attacker 34 or legitimate source of the new TAC makes the SIB indicate that a change has occurred, causing the UE 12 to read the SIB, in this example containing the compromised (here, overwritten) information, in this example the compromised or changed TAC. In some cases, the attacker 34 can inject a Paging message with systemInfoModification set to true. In response to the TAC being changed, the UE 12 initiates a Tracking Area Update (TAU) and sends a TAU Request message 180 in order to obtain the updated or the latest TAI list that is expected to contain the updated TAC.

At stage 158, the method 150 includes the base station 23, and in particular a Mobility Management Entity (MME), sending an EMM TRACKING AREA UPDATE ACCEPT (TAUA) (that is integrity protected) message 182 to the UE 12. The TAU Request 180 is sent by the UE 12 to the base station 23, and the base station 23 responds by sending a TAU Accept message 182 to the UE 12. The TAU Accept message 182 includes the latest TAI list (a "newly-received" or "present" TAI list) that is integrity protected. The processor 40 receives the present TAI list from the message 182 via the antenna 50 and the transceiver 48 and temporarily keeps the present TAI list for comparison with the previously-stored TAI list (e.g., received as part of the ATTACH ACCEPT message 176 or alternatively a TAU Accept message 173) to determine validity of the SIB update.

At stage 160, the method 150 includes determining whether the present TAI list (in the message 182) and the previously-stored TAI list (in the message 176) match. If the UE 12 earlier found the SIB update flag to be true, and TAC has changed, but the present TAI list (in the message 182) and the previously-stored TAI list (in the message 176) match, then the UE 12 determines that an exploit occurred and the changed TAC is fake. If the present TAI list does not match the previously stored TAI list (indicating that the new TAC may be valid), then the method 150 proceeds to stage 162. If the present TAI list matches the previously stored TAI list (indicating that the new TAC is invalid), the SIB update flag was found to be true, and the TAC is different than the previous TAC, then the method 150 proceeds to stage 164 where the processor 40 identifies the change in the TAC as invalid and may take one or more appropriate actions, e.g., one or more countermeasures.

At stage 162, the method 150 includes determining whether a change in the TAI list is valid and updating the previously-stored TAI list with a validly-changed TAI list. At stage 162, the UE 12 further checks as to whether the SIB update (read) flag was set to be true or false. If the SIB read flag was set as true and the TAC was changed, then the situation is as expected and the UE 12 may verify the change in the TAC and replace a verified TAC in the previously-stored TAI list, which will then serve as the previously-stored TAI list for a future comparison with a newly-received TAI list. The processor 40 may verify that the new TAC received in stage 156 in unprotected information matches the corresponding TAC in the present TAI list (i.e., protected information), received in stage 158, before updating the previously-stored TAI list. If SIB read flag was false, but the present and previously-stored TAI lists differ, then the situation is an error case and the UE 12 may identify the changed TAI list, or the changed portion of the TAI list, as invalid. Similarly, if the SIB read flag is false and the TAC changed, then the situation is an error and the changed TAC is invalid. If the SIB read flag is false and the TAC is unchanged, but the newly-received TAI list is different, then the situation may or may not be an error.

Example Use Cases

Some other use-case examples are briefly described in this paragraph. A first other example use case is for the case of an LTE to Circuit Switched Fallback (CSFB) situation that can be exploited. In this case, the UE is camped on LTE and is in active data connection when the UE gets paged (which may be due to the signal injection attack) for a circuit switched (CS) call, which is unprotected. For handling the CS call, the UE will fall back to WCDMA where if the UE does not find the actual call, then the method in this disclosure can determine that the CSFB page is injected. In this case, the absence of the CS call leads to the determination that the CS page is fake and injected. The purpose of the exploit here is disruption in the LTE service. In the same example with the UE camped on LTE and in active data connection and getting paged (which may be due to the signal injection attack) for a CS call, the UE may send an extended service request for a Mobile Terminated (MT) call to the network. The network might send a service reject to the UE if the paging for the CS call is fake and injected. In this case, the presence of the integrity-protected service reject response allows the UE to determine that the unprotected paging for the CS call is fake. A second other example use case is when an attacker injects the unprotected paging message with an S-TMSI (SAE Temporary Mobile Subscriber Identity) and sniffs the non-encrypted RRC CONNECTION SETUP message to determine if the UE is in the area. In this example, the UE can determine by the absence of any integrity-protected response from the valid base station that the paging message is invalid since in the exploit case the base station will not have any services waiting for the UE once the UE responds to a fake injected TMSI page (which is unprotected). A third other example use case involves compromising the Cell Barred indicator signal in SIB1. The attacker can inject the cell barred indicator as true and cause the UE to detach from the cell, or the attacker can inject the cell barred indicator as false and cause the UE to attempt to attach to the cell in which the UE is barred. A similar use case is the Barring Factor in SIB2. The attacker can inject barring parameters in SIB2 for Mobile Originated (MO) Signaling, MO-Data, etc., and cause the UE to selectively bar service, causing Data DoS (Denial of Service) for example. In both of these Cell Bar related use cases (SIB1 and SIB2), the UE can observe if the network (Base Station) offers service to the UE and if so, then the UE would indicate the Cell Barring was maliciously injected to corrupt the actual value in the SIBs. A fourth other example use case involves the attacker injecting a signal to corrupt the unprotected PLMN List in SIB1. If the valid PLMN is the UE home PLMN, the attacker can overshadow the valid PLMN by injecting with a blacklisted PLMN that is in a UE SIM card (i.e. Military PLMN) and cause the UE to detach from the cell. However, the valid PLMN will still respond with ATTACH ACCEPT or TAU ACCEPT for any ATTACH or TAU activity, which the UE 12 will interpret as an indication that the unprotected PLMN that caused the detachment was invalid. If the valid PLMN is not the UE home PLMN (e.g., the UE is in roaming/barred/etc. PLMN), then the attacker can overshadow by injecting with the home PLMN of the UE 12, and the UE 12 will attempt to attach to the cell corresponding to the injected PLMN and get a reject message (ATTACH REJECT or TAU REJECT), from which the UE 12 will conclude that the unprotected PLMN was invalid Other Considerations Having described several example configurations, other examples or implementations including various modifications, alternative constructions, and equivalents may be used. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. Elements discussed may be components of a larger system, wherein other rules may take precedence over or otherwise modify the application of the invention. Also, a number of operations may be undertaken before, during, or after above-discussed elements or operations are considered.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof" means A or B or C or AB or AC or BC or ABC (i.e., A and B and C), or combinations with more than one feature (e.g., AA, AAB, ABBC, etc.).

A signal, or signals, may be referred to by the same term despite having been processed or otherwise altered. For example, a wireless signal may be received and transduced, and perhaps decoded or had information added or removed or have otherwise been modified, yet the wireless signal and the modified signal may both be referred to by the same term such as "the received signal." Thus, the same signal term may be used as a shorthand reference to shared content of the unmodified and the modified signal.

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

Substantial variations may be made in accordance with specific implementations. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a CD-ROM, any other optical medium, a RAM, a PROM, EPROM, a FLASH-EPROM, or any other memory chip or cartridge.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process or a method that is depicted as a flow diagram or block diagram. Although operations may be discussed as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

What is claimed is:

1. A mobile wireless communication device comprising:
a memory;
an antenna configured to send and receive signals; and
a processor, communicatively coupled to the antenna and to the memory, configured to:
receive present unprotected information and present protected information;

retrieve previous unprotected information, corresponding to the present unprotected information, and previous protected information, corresponding to the present protected information, from the memory;
compare the present unprotected information to the previous unprotected information to determine that an unprotected information change has occurred;
compare the present protected information to the previous protected information to determine whether a protected information change has occurred; and
determine that the present unprotected information is valid in response to the protected information change having occurred and being consistent with the unprotected information change, or that the present unprotected information is invalid otherwise.

2. The mobile wireless communication device of claim 1, wherein the processor is configured to determine that the present unprotected information is invalid based on a determination that the present protected information is the same as the previous protected information.

3. The mobile wireless communication device of claim 1, wherein the present unprotected information comprises a first Tracking Area Code (TAC), and wherein the processor is configured to determine that the present unprotected information is valid in response to:
the previous protected information comprising a portion of a Tracking Area Identity that includes a second TAC;
the present protected information comprising a third TAC;
the second TAC differing from the third TAC; and
the third TAC matching the first TAC.

4. The mobile wireless communication device of claim 1, wherein the processor is configured to determine that the present unprotected information is invalid in response to the present protected information differing from the previous protected information but not including the present unprotected information.

5. The mobile wireless communication device of claim 1, wherein the processor is configured to replace the previous protected information in the memory with the present protected information in response to the present protected information differing from the previous protected information and including the present unprotected information.

6. The mobile wireless communication device of claim 1, wherein to determine whether the protected information change is consistent with the unprotected information change, the processor is configured to determine whether a protected protocol has changed consistent with the unprotected information change.

7. The mobile wireless communication device of claim 6, wherein the processor is configured to determine that the present unprotected information is invalid in response to determining: that a first time window passes without an expected protected indication being received, or that an unexpected protected indication is received within a second time window.

8. The mobile wireless communication device of claim 7, wherein the unexpected protected indication comprises an ATTACH ACCEPT message, or a TAU (Tracking Area Update) ACCEPT message, from a base station from which the mobile wireless communication device detached, or comprises an ATTACH REJECT message, or a TAU REJECT message, in response to an attempt to attach to a base station corresponding to a PLMN (Public Land Mobile Network) indicated in an unprotected message.

9. The mobile wireless communication device of claim 1, wherein the processor is configured to send a request for the present protected information in response to the processor determining that the unprotected information change occurred.

10. A mobile wireless communication device comprising:
receiving means for wirelessly receiving present unprotected information and present protected information;
means for retrieving previous unprotected information, corresponding to the present unprotected information, and previous protected information, corresponding to the present protected information, from a memory of the mobile wireless communication device;
means for comparing the present unprotected information to the previous unprotected information to determine that an unprotected information change has occurred;
means for comparing the present protected information to the previous protected information to determine whether a protected information change has occurred; and
determining means for determining that the present unprotected information is valid in response to the protected information change having occurred and being consistent with the unprotected information change, or that the present unprotected information is invalid otherwise.

11. The mobile wireless communication device of claim 10, wherein the determining means are for determining that the present unprotected information is invalid in response to determining that the present protected information is the same as the previous protected information.

12. The mobile wireless communication device of claim 11, wherein the determining means are for determining that the present unprotected information is invalid in response to determining: that a first time window passes without an expected protected indication being received, or that an unexpected protected indication is received within a second time window.

13. The mobile wireless communication device of claim 10, wherein the present unprotected information comprises a first Tracking Area Code (TAC), and wherein the determining means are for determining that the present unprotected information is valid in response to:
the previous protected information comprising a portion of a Tracking Area Identity that includes a second TAC;
the present protected information comprising a third TAC;
the second TAC differing from the third TAC; and
the third TAC matching the first TAC.

14. The mobile wireless communication device of claim 10, wherein the determining means are for determining that the present unprotected information is invalid in response to determining that the present protected information differs from the previous protected information but does not include the present unprotected information.

15. The mobile wireless communication device of claim 10, further comprising means for replacing the previous protected information in the memory of the mobile wireless communication device with the present protected information in response to the present protected information differing from the previous protected information and including the present unprotected information.

16. A method of detecting compromised message information, the method comprising:
wirelessly receiving, at a mobile wireless communication device, present unprotected information and present protected information;
retrieving previous unprotected information, corresponding to the present unprotected information, and previous protected information, corresponding to the present protected information, from a memory of the mobile wireless communication device;

comparing the present unprotected information to the previous unprotected information to determine that an unprotected information change has occurred;

comparing the present protected information to the previous protected information to determine whether a protected information change has occurred; and determining that the present unprotected information is valid in response to the protected information change having occurred and being consistent with the unprotected information change, or that the present unprotected information is invalid otherwise.

17. The method of claim 16, wherein determining that the present unprotected information is invalid comprises determining that the present protected information is the same as the previous protected information.

18. The method of claim 16, wherein the present unprotected information comprises a first Tracking Area Code (TAC), and wherein the present unprotected information is determined to be valid in response to:
the previous protected information comprising a portion of a Tracking Area Identity that includes a second TAC;
the present protected information comprising a third TAC;
the second TAC differing from the third TAC; and
the third TAC matching the first TAC.

19. The method of claim 16, wherein determining that the present unprotected information is invalid comprises determining that the present protected information differs from the previous protected information but does not include the present unprotected information.

20. The method of claim 16, further comprising replacing the previous protected information in the memory of the mobile wireless communication device with the present protected information in response to the present protected information differing from the previous protected information and including the present unprotected information.

21. The method of claim 16, further comprising determining whether the protected information change is consistent with the unprotected information change by determining whether a protected protocol has changed consistent with the unprotected information change.

22. The method of claim 21, wherein determining that the present unprotected information is invalid comprises determining: that a first time window passes without an expected protected indication being received, or that an unexpected protected indication is received within a second time window.

23. The method of claim 22, wherein the unexpected protected indication comprises an ATTACH ACCEPT message, or a TAU (Tracking Area Update) ACCEPT message, from a base station from which the mobile wireless communication device detached, or comprises an ATTACH REJECT message, or a TAU REJECT message, in response to an attempt to attach to a base station corresponding to a PLMN (Public Land Mobile Network) indicated in an unprotected message.

24. The method of claim 16, further comprising sending a request from the mobile wireless communication device for the present protected information in response to determining that the unprotected information change has occurred.

25. A non-transitory, processor-readable storage medium comprising processor-readable instructions configured to cause a processor to:
receive present unprotected information and present protected information;
retrieve previous unprotected information, corresponding to the present unprotected information, and previous protected information, corresponding to the present protected information, from a memory;
compare the present unprotected information to the previous unprotected information to determine that an unprotected information change has occurred;
compare the present protected information to the previous protected information to determine whether a protected information change has occurred; and
determine that the present unprotected information is valid in response to the protected information change having occurred and being consistent with the unprotected information change, or that the present unprotected information is invalid otherwise.

26. The storage medium of claim 25, wherein the instructions are configured to cause the processor to determine that the present unprotected information is invalid in response to the present protected information being the same as the previous protected information.

27. The storage medium of claim 26, wherein the instructions are configured to cause the processor to determine that the present unprotected information is invalid in response to the present protected information differing from the previous protected information but not including the present unprotected information.

28. The storage medium of claim 26, further comprising instructions configured to cause the processor to replace the previous protected information in the memory with the present protected information in response to the present protected information differing from the previous protected information and including the present unprotected information.

29. The storage medium of claim 26, wherein the instructions are configured to cause the processor to determine that the present unprotected information is invalid in response to determining: that a first time window passes without an expected protected indication being received, or that an unexpected protected indication is received within a second time window.

30. The storage medium of claim 25, wherein the present unprotected information comprises a first Tracking Area Code (TAC) and the instructions are configured to cause the processor to determine that the present unprotected information is valid in response to:
the previous protected information comprising a portion of a Tracking Area Identity that includes a second TAC;
the present protected information comprising a third TAC;
the second TAC differing from the third TAC; and
the third TAC matching the first TAC.

* * * * *